May 4, 1965  R. J. PETROFF  3,181,378
INTERMITTENT MOTION MECHANISM
Filed Feb. 4, 1963  2 Sheets-Sheet 2
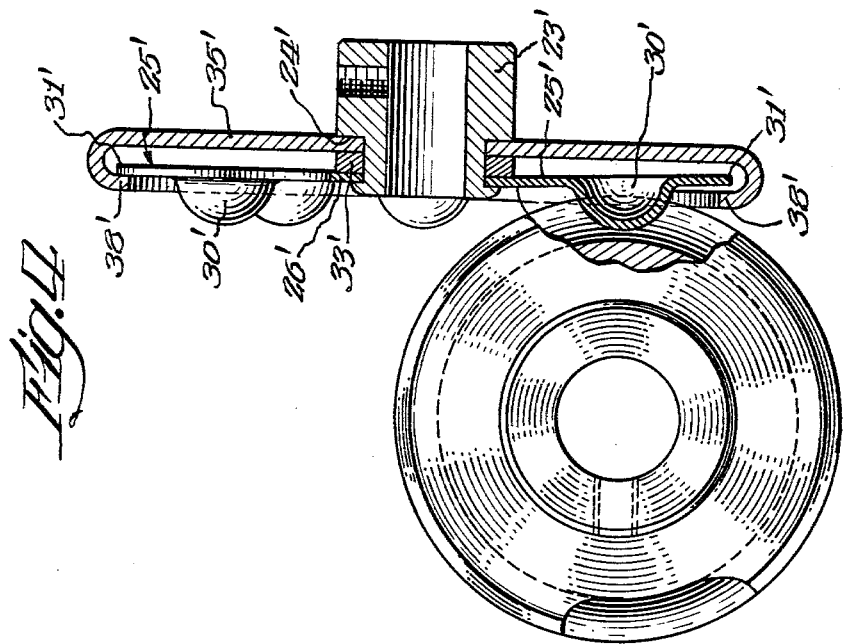
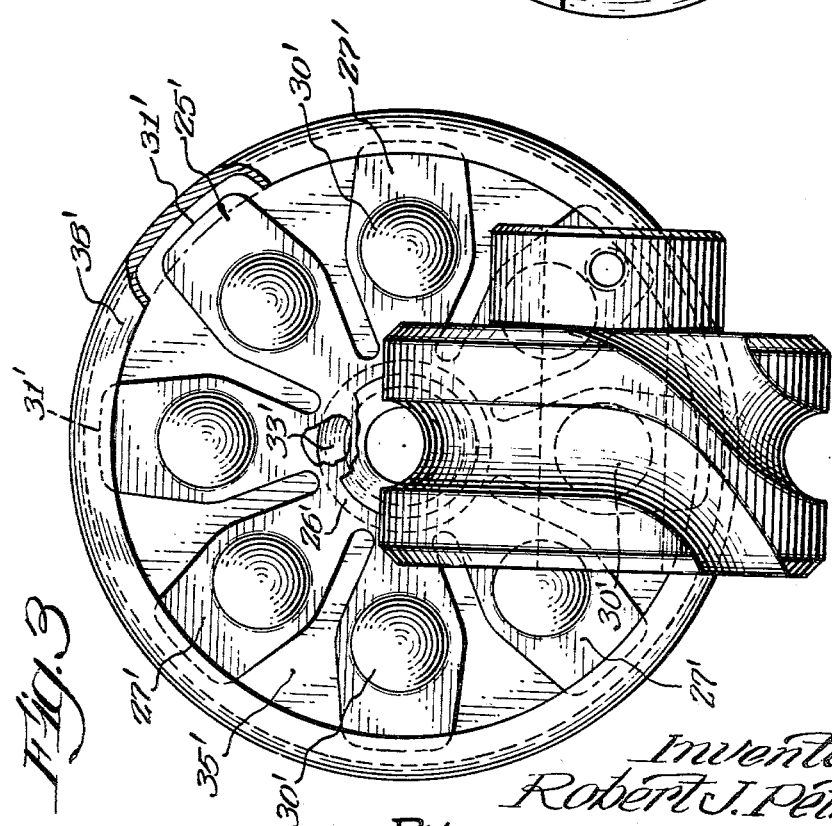
Inventor:
Robert J. Petroff
By Robert L. Kahn ATTY.

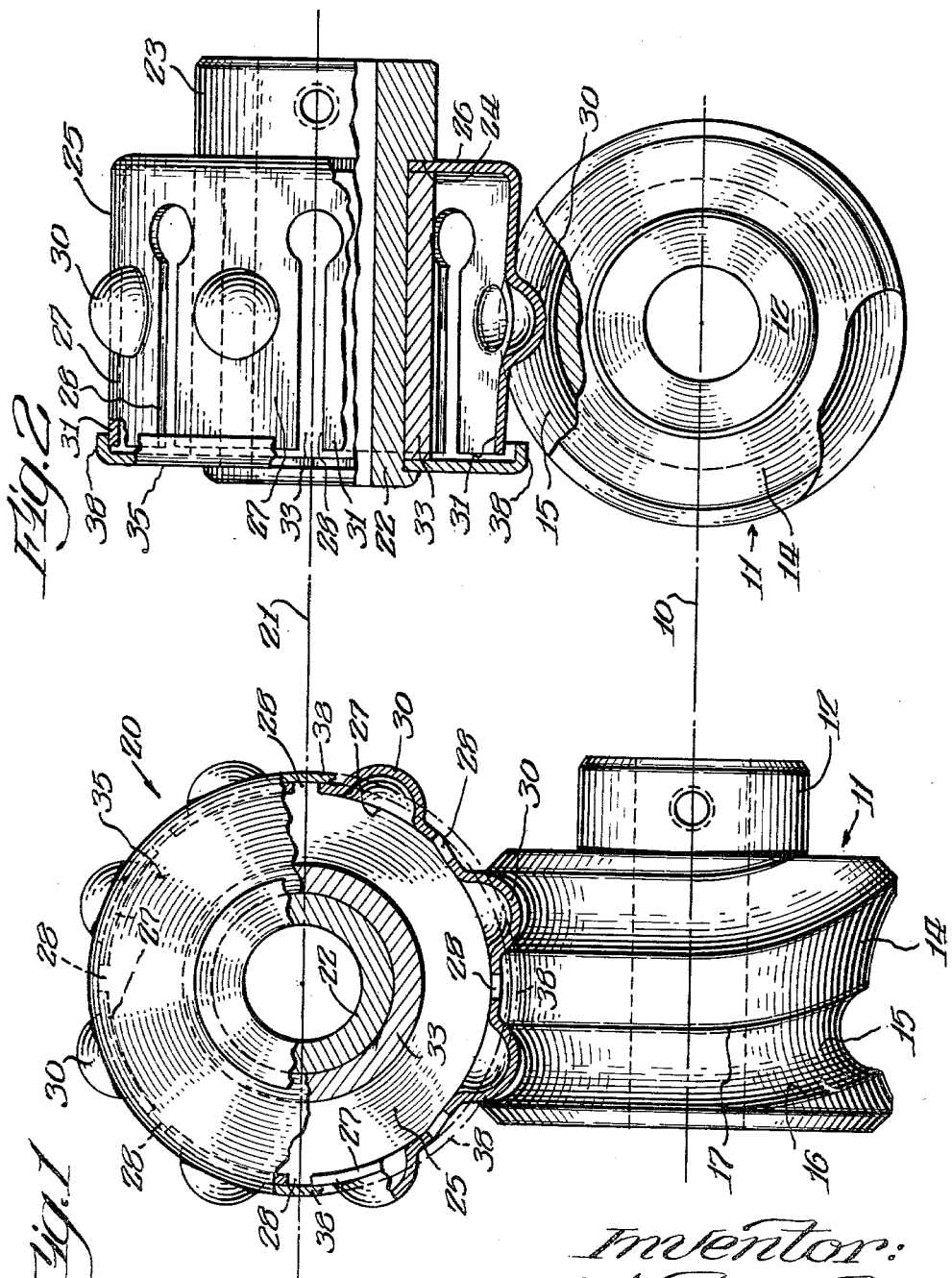

United States Patent Office 3,181,378
Patented May 4, 1965

3,181,378
INTERMITTENT MOTION MECHANISM
Robert J. Petroff, Lombard, Ill. (% R. Petroff Associates, 5101 W. Lake St., Chicago 44, Ill.)
Filed Feb. 4, 1963, Ser. No. 255,981
4 Claims. (Cl. 74—84)

This invention relates to intermittent motion mechanism, and more particularly to a modified type of roller gear mechanism.

Roller gear intermittent motion mechanisms are well known and are used for heavy duty work. In such a mechanism, a cam which has a worm type of cam track cooperates with a follower having a number of radially extending studs or arms, each of which is provided with a roller bearing. This type of mechanism is inherently expensive because of the presence of anti-friction bearings. It is practically impossible to miniaturize this type of mechanism and provide a practical structure. This is due principally to the large cost of miniature bearings plus the additional factor of delicacy of small bearings. Small bearings have sleeves which are very thin and cannot stand abuse and are carried by studs which would have little strength. In addition, roller type intermittent motion mechanisms should have means for maintaining the cam and follower parts in predetermined relationship for precise work and frequently this involves a certain amount of pre-loading. This objective can not be obtained with present day structures without substantial cost.

The present invention makes possible an intermittent type of mechanism which may be considered as a modification of the roller bearing type. The present invention constitutes a modification and to some extent an improvement upon the structures disclosed and claimed in my copending application Serial No. 255,982, filed concurrently herewith. The structure embodying the present invention utilizes essentially the same type of cam as required by roller bearing type of intermittent motions. However, the follower is different in having a plurality of embossings of hemispherical or conical shape disposed on the follower body so that these surfaces can describe a circular path during follower rotation. These embossings are spaced at uniform intervals around the axis of rotation of the follower and each embossing cooperates with the cam track or cam wall so that a follower action results upon rotation of the cam.

The invention generally may be embodied in two different types of structures. In one type of structure, the embossings are disposed on a cylindrical surface, whereas in the other type of structure, the embossings extend laterally from a flat face which is normal to the axis of rotation of the follower. In both types, the axis of rotation of the cam is generally perpendicular to and laterally offset from the axis of rotation of the follower. The principal advantage of structures embodying the present invention resides in the economy of manufacture of such devices, together with substantial accuracy which may be obtained thereby and also with the manner in which pre-loading of the cam and follower is obtained. Structures embodying various modifications of the invention may be readily manufactured in small sizes out of various materials and thus make possible cheap but highly effective and highly efficient intermittent mechanisms. Such mechanisms have substantially all of the advantages of a roller gear type of intermittent motion without the disadvantages previously set forth.

The invention will now be set forth in connection with the drawings wherein:

FIGURE 1 is an elevation of one form of the invention.
FIGURE 2 is a view at right angles to FIGURE 1.
FIGURE 3 is an elevation of a modified form of the invention.
FIGURE 4 is a view at right angles to FIGURE 3.

Referring first to FIGURES 1 and 2, 10 designates a drive axis about which worm type of cam 11 can rotate. In general, the direction of rotation is unimportant. This cam consists of hub portion 12 and body 14. Cam body 14 is provided with worm type of cam track 15 which extends around axis 10. Cam track 15 has side walls 16 and 17. If the track pitch is constant, the track describes a worm. However, the pitch of the track need not be constant, so that, generally speaking, cam track 15 may be considered as a worm type of cam track. It is understood that the cam track may have any desired shape to secure desired movements. Thus it is possible to provide an index action wherein a sudden movement is followed by a dwell.

Cam 11 has a general outline of an hourglass to provide a globoidal cam. The outline of this globoidal cam will depend upon the radius of the rotatable member to be described, which cooperates with this cam. The larger the radius, the more nearly body 14 can approach a cylinder, with track 15 providing a conventional worm type cam track along a cylindrical body.

Cooperating with cam track 15 is driven member 20 rotatable about axis 21. Axis 21 is preferably at right angles to and laterally offset from axis 10. Driven member 20 has hub portion 22. Hub portion 22 is part of body portion 23 of the driven member and between hub portion 22 and the remainder of body portion 23 is shoulder 24. Disposed against shoulder 24 is annular member 25 having flange portion 26 and finger portions 27 extending from flange portion 26 in a direction generally parallel to axis 21. Adjacent finger portions 27 are separated by slots 28. Each finger portion 27 has formed therein hemispherical or conical embossing 30 extending outwardly from the axis of the driven member.

Finger members 27 are spaced at uniform angular intervals around axis 21 and each finger has its own embossing 30. The dimension of embossing 30 is substantially smaller than the length of each finger 27, so that each finger 27 will have end portion 31 which will be available for retention. Annular member 25 is maintained in position on hub 22 by sleeve 33 which can slide over the hub and can press flange portion 26 against shoulder 24. Sleeve 33 is maintained in position by end plate 35 and portion 36 of hub 22 which can be turned over or spun to lock end plate 35. End plate 35 has flange 38 which is bent at right angles to the body of the end plate and can overlie end portion 31 of each spring finger 27.

Member 25 is of material which has substantial mechanical strength and which has some spring or elasticity. Preferably, end plate 25 is made of metal such as iron, steel or brass, or any other metal having some spring thereto. Prior to the assembly of the parts as shown, it is preferred to have finger portions 27 normally assume a position where the finger portion flares or extends outwardly away from axis 21 and the position illustrated in FIGURES 1 and 2 would be the stressed condition of each finger.

As may be readily appreciated, the orientation of embossings 30, together with the dimensions thereof, is such as to permit the follower member to cooperate with the cam by having individual embossings engage the cam track or the wall between the cam track, depending upon how many embossings are to be in position during a dwell. The driver and follower are assembled to the positions illustrated in FIGURES 1 and 2 and some pre-loading may be provided by having the cam press each finger inwardly toward the axis of the driven member as it engages the embossing so that when an embossing is engaged by the cam, there will be a tendency for finger 27 to be pushed inwardly with end portion 31 moved inwardly away from flange 38. The amount of such movement need not be great.

The gauge of metal or material used for member 25 and the springiness thereof will depend upon the nature of the metal used, as well as the amount of load. For light loads, the metal making member 25 need not be too heavy and need not offer too much resistance to bending. If the load is apt to be substantial, then it may be necessary to increase the resistance of the metal to bending so that it takes more force to push a finger on a follower in.

While member 25 is most conveniently made of metal, there may be instances where plastic may be used. In fact, it is possible to mould member 25 and disk 35 all in one piece and slip such a follower unit over hub 22. Sleeve portion 33 may be retained as part of such a moulded assembly or may be eliminated and the entire follower assembly may be integrated into one piece. In such case, the yielding of the plastic that is used will supply the desired pre-loading.

It is evident that a large variety of follower bodies having hemispherical or conical embossings may be made for cooperation with a driver cam. The cam itself need not necessarily be of metal and may also be moulded of plastic. Such a possibility can result in an intermittent movement which is cheap when manufactured in large quantities and which can operate at high speeds with substantial efficiency. In making embodiments of the invention, it will be desirable to select materials for the embossing of the follower and the cam of the driver so that binding will not result. Thus it may be desirable to have different metals for the embossing and cam, or different materials if a metal is used, for at least one of these two parts.

Referring now to FIGURES 3 and 4, the modification here has embossings 30' lying in a flat plane and carried by disk 25'. Disk 25' has fingers 27' with end portions 31' available for engagement by overhanging flange portion 38' of end disk 35'. In this particular modification, end disk 35' is disposed against shoulder 24' of body 23'. Spacer 33' which in practice would be a washer is disposed between end plate 35' and the inside portion 26' of disk member 25'.

The form of the invention illustrated in FIGURES 1 and 2 makes it necessary to space axes 10 and 21 a distance of the order of the sum of the radii of the cam and follower members. In the modification illustrated in FIGURES 3 and 4, the spacing between the two axes is reduced to something less than the radius of the cam. Thus the modification illustrated in FIGURES 3 and 4 may be advantageous in certain assemblies where a reduced space in the direction shown in FIGURES 3 and 4 is advantageous. On the other hand, the modifications illustrated in FIGURES 1 and 2 takes less space along the direction of axis 21. Each of the modifications described has its own advantages for use in cases where space may be at a premium. In general, the pre-loading may be obtained by the modification illustrated in FIGURES 3 and 4 in substantially the same manner as suggested in connection with FIGURES 1 and 2.

In the two modifications, it is possible to omit the slots between adjacent embossings and rely upon the buckling of the edge portion of the follower. This may provide greater pre-loading and permits the use of simple disc followers.

What is claimed is:

1. An intermittent motion comprising a modified roller gear type of mechanism, said mechanism comprising a cam having a worm type of cam groove and rotatable about an axis, a follower member rotatable about an axis which is generally perpendicular to and laterally offset from the cam axis, said follower having a member provided with a plurality of spring fingers, each finger having an embossing, said fingers and embossings being disposed in a pattern so that upon rotation of said follower about its axis, the embossings will move circularly about the axis of said follower, means for maintaining said fingers in stressed condition so that an embossing can cooperate with said cam track for effecting follower rotation upon rotation of said cam as a driver, said spring finger when the embossing engages the cam being urged against its spring to effect pre-loading.

2. The construction according to claim 1 wherein said means for maintaining said fingers includes a flanged member engaging the ends of said fingers and maintaining the same in a stressed condition, the finger being adapted to be further stressed when a cam exerts force upon a particular embossing during engagement.

3. The construction according to claim 1 wherein said follower member has the fingers extending generally parallel to the follower axis so that the embossings are generally on the surface of a cylinder.

4. The construction according to claim 1 wherein said follower is spider-shaped so that the spring fingers and embossings lie generally in a flat plane.

References Cited by the Examiner
UNITED STATES PATENTS

| | | | |
|---|---|---|---|
| 1,222,155 | 4/17 | Steele | 74—462 |
| 1,690,349 | 11/28 | Walter | 74—462 |
| 2,714,315 | 8/55 | Reader | 74—465 |
| 2,923,166 | 2/60 | Brindley | 74—462 X |
| 3,049,017 | 8/62 | McDonald | 74—84 |

FOREIGN PATENTS 220,811  8/24  Great Britain.

BROUGHTON G. DURHAM, *Primary Examiner.*